United States Patent [19]

Fiorucci et al.

[11] 4,421,662
[45] Dec. 20, 1983

[54] NONAQUEOUS PURIFICATION OF MIXED NITRATE HEAT TRANSFER MEDIA

[75] Inventors: Louis C. Fiorucci, Hamden; Michael J. Morgan, Guilford, both of Conn.

[73] Assignee: Olin Corporation, New Haven, Conn.

[21] Appl. No.: 414,725

[22] Filed: Sep. 13, 1982

[51] Int. Cl.³ .................. C09K 5/06; C01D 9/16; C01F 11/36
[52] U.S. Cl. .................. 252/70; 423/395; 423/397
[58] Field of Search .................. 252/70; 423/395, 397

[56] References Cited

U.S. PATENT DOCUMENTS 2,375,758  5/1945  Bates .................. 423/395
2,375,759  5/1945  Kalicheusky et al. .................. 423/395

FOREIGN PATENT DOCUMENTS 53-8014785  5/1978  Japan .................. 252/70

OTHER PUBLICATIONS

P. A. Rottenburg, M. A., "Heat Transfer Media for Use at Elevated Temperatures" in *Trans. Instn. Chem. Engrs.*, vol. 35, 1957, pp. 22–36.

Primary Examiner—John E. Kittle
Assistant Examiner—Robert A. Wax
Attorney, Agent, or Firm—Arthur E. Oaks; Donald F. Clements

[57] ABSTRACT

A nonaqueous, in-line method for removing carbonate and hydroxide contamination from a molten mixed sodium nitrate/potassium nitrate heat transfer salt. The method comprises dissolving a stoichiometric quantity of anhydrous $Ca(NO_3)_2$ in the melt whereby an insoluble $CaCO_3$ and $Ca(OH)_2$ precipitate is formed. The precipitate can be removed by settling, filtration or floatation techniques.

18 Claims, 2 Drawing Figures

MOLTEN SALT FILTRATION

MOLTEN SALT FILTRATION

IN-LINE SEPARATORY CHAMBER

NONAQUEOUS PURIFICATION OF MIXED NITRATE HEAT TRANSFER MEDIA

This invention relates to mixed nitrate heat transfer media. More particularly, it relates to a nonaqueous method for purifying said media for use in a closed loop solar power station.

BACKGROUND OF THE INVENTION

As a result of the energy crisis, there has been a considerable interest in developing alternative sources of energy for electric power stations to replace increasingly expensive imported petroleum products. One method which has generated considerable interest is the use of solar energy as a heat source for generating steam for electric power generation. In this process, it is necessary to concentrate the energy coming from the sun to heat a liquid which absorbs the heat and carries it to the generator. In relatively low power hot water or space heating systems, the liquid is water. This is either pumped or fed by gravity through a plurality of solar panels to a storage medium, generally crushed rock, from which the heat is extracted for subsequent use. Such systems are beginning to find wide use in home heating and hot water applications, particularly in the Southwest where long periods of sunlight are the norm. However, when it is desired to use solar energy as a source for large scale electric power application, the relatively low boiling point of water makes its use unsatisfactory unless high pressure components are used throughout the system. It would be much better if a low pressure system could be used.

One type of thermal transfer medium which has evoked considerable interest is mixed inorganic salts having a relatively large spread between their melting and boiling points. Many of these have relatively high specific heats so that they are able to absorb large quantities of thermal energy per degree of temperature rise more efficiently than many types of metallic or organic heat transfer media. When liquified, these salts can be readily pumped to and through a "power tower" or similar heat concentration system to obtain a large quantity of sensible heat which is then utilized in a more-or-less conventional steam generator/turbine system for electric power generation. For such use, a number of salt mixtures are known which are stable at temperatures of up to about 900° F.

One particular salt mixture which has been proposed as a practical thermal storage medium for these purposes is a eutectic mixture of sodium nitrate and potassium nitrate. Such a mixture meets the above-stated criteria in that its melting point is relatively low, being about 400° F. and, when molten, is both quite fluid and, most critically, stable at temperatures of up to about 1200° F. Furthermore, the eutectic composition, unlike those of most metallic alloys, is quite broad, ranging from about 30% to about 70% by weight of sodium nitrate in the mix. Thus, tolerance to minor changes in the sodium/potassium ratio is extremely high. Further, the raw materials are widely available and relatively low in cost.

However, to avoid potential operating problems with stress corrosion and line pluggage, it is necessary that both components of the mix be essentially free of chloride and high melting point carbonate, oxide and sulfate impurities, with a combined maximum total purity level of about 0.7% being considered acceptable and with the chloride level being no more than about 0.2%. Further, once having produced the material to this level of purity, there remains the problem of keeping it substantially at such a level once the material is put in use.

In common with power systems such as pressurized water nuclear reactors, a solar power generating system is a dual loop system. In this, the heat generation aspects are in one loop and the power generation aspects in a second loop. For all practical purposes, these loops are completely separate, being joined only at a heat exchanger type steam or vapor generator wherein the working fluid for the power turbine is formed. Because of the hazards associated with exposing a molten oxidizing medium at high temperature, the heat generation loop is kept closed with the cooled but still fluid nitrate salt mixture being pumped either back to the power station heliostat field for reheating or to an internal reservoir for storage until needed.

There is relatively little experience in using mixed nitrate salts in closed loop heat transfer systems. The largest reported use was with reactors employing the Houdry fixed bed process for cracking petroleum. These were mainly used from about 1940 to about 1950 during which time it was found that the molten salt would react with water vapor or carbon dioxide to form respectively hydroxide or carbonate contaminants. Even small amounts of these tended to increase the corrosive nature and, more significantly, raise the melting point of the fluid. Further, it was found that the carbonates tended to form a tightly adhering scale in areas of low velocity flow thus increasing the pressure drop within the system.

Mixed nitrate salt for power station use is provided in the form of dry, non-friable flakes or granules having a melting point of about 400° F. The nominal composition is about 60 weight % $NaNO_3$ and about 40 weight % $KNO_3$. Current published product specifications state the minimum acceptable purity to be about 99.3% with the maximum allowable combined carbonate and hydroxide content being about 0.4%. The salt is charged into a melting chamber where it is heated to a temperature of between about 450° and 600° F. and preferably to between about 500° and about 550° F. under an inert atmosphere. When the charge is fully melted, it is then ready for use within the system.

In use, the molten salt will react with traces of water vapor and carbon dioxide to form hydroxides and carbonates along with some oxides of nitrogen. Further, if the temperature at local hot spots in the system exceeds about 1250° F., the nitrates will break down to form alkali metal oxides, oxygen and nitrogen. The oxides, in turn, will react with water and $CO_2$ according to the equations:

$$M_2O + H_2O \rightarrow 2MOH \qquad (1)$$

$$M_2O + CO_2 \rightarrow M_2CO_3 \qquad (2)$$

Where M is Na or K

While proper design of the system will keep the levels of these contaminants to a minimum, they cannot be completely eliminated. Therefore, it is necessary to remove them, on a more or less continuous basis, within the confines of the closed nitrate salt loop.

BRIEF SUMMARY OF THE INVENTION

The present invention is a process for removing insoluble hydroxide and carbonate contaminants in a molten mixed sodium nitrate/potassium nitrate heat transfer and thermal storage medium used in a closed loop solar powered electric generating a closed loop solar powered electric generating station.

In the process of the present invention, these contaminants are removed by adding anhydrous calcium nitrate to the molten salt. While calcium nitrate is soluble in the mass, its oxide, hydroxide and carbonate compounds are essentially insoluble therein and precipitate out. These can be removed either by settling out, filtration or floatation techniques in suitably designed facilities, without perturbing the normal operation of a closed loop heat generation system.

It is an object of the present invention to provide a method for removing oxide, hydroxide and carbonate impurities from molten sodium nitrate/potassium nitrate heat transfer media.

It is a further object of the present invention to provide a method for removing oxide, hydroxide and carbonate impurities from molten sodium nitrate/potassium nitrate heat transfer media within the confines of a solar power generating station.

These and other objects of the invention will become apparent from the following description and the appended claims.

DETAILED DESCRIPTION OF THE INVENTION

In the process of subject invention, anhydrous $Ca(NO_3)_2$ is reacted with carbonate and hydroxyl ions in a molten mixture of sodium nitrate and potassium nitrate to form insoluble salts therewith according to the equation:

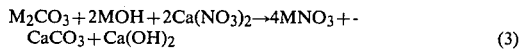

$$M_2CO_3 + 2MOH + 2Ca(NO_3)_2 \rightarrow 4MNO_3 + CaCO_3 + Ca(OH)_2 \qquad (3)$$

Where M is Na or K

Figure 1:
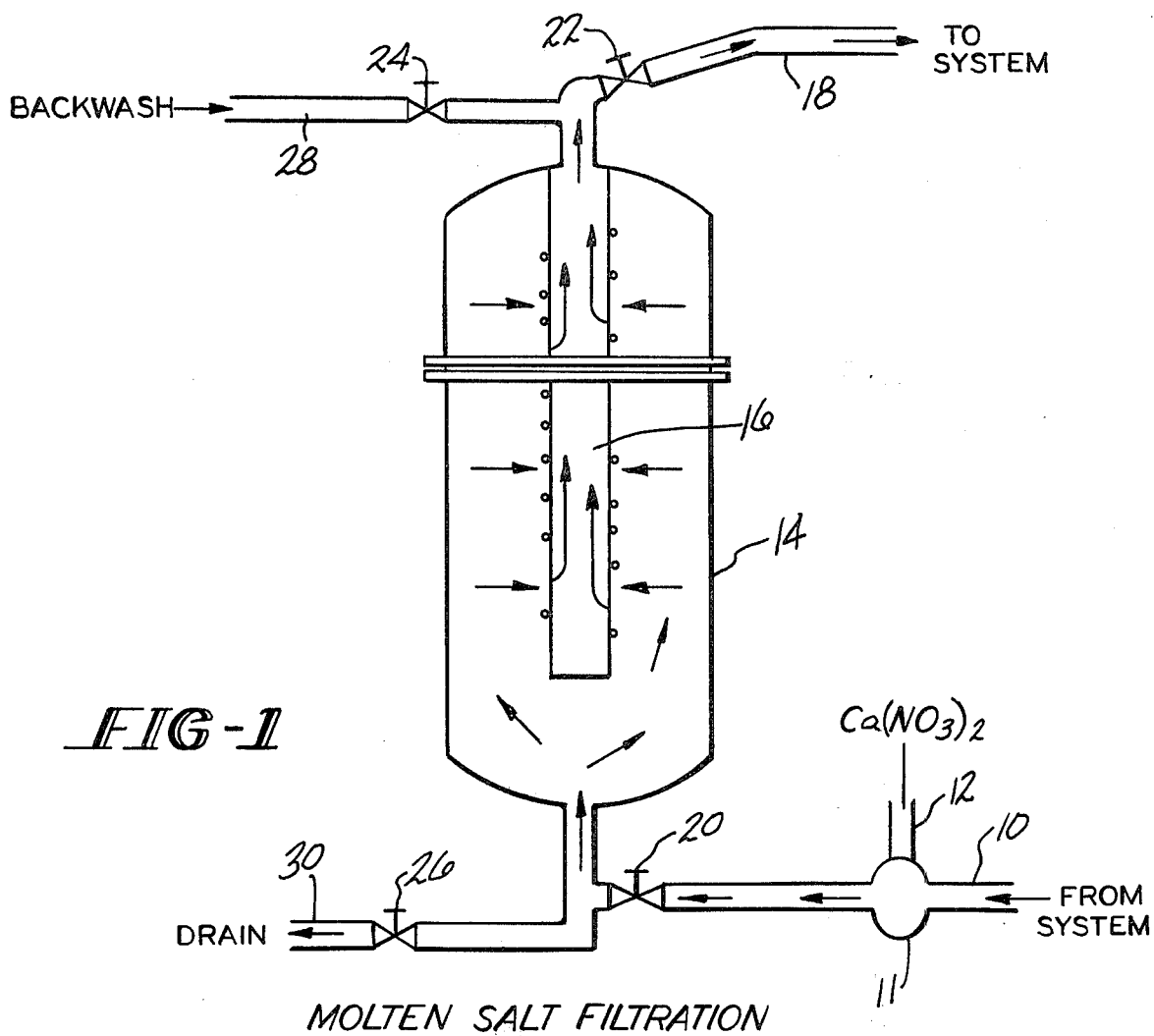
FIG. 1 is a schematic drawing of a system for removing precipitated carbonates and hydroxides from molten nitrate heat transfer salt streams by filtration.

The $Ca(NO_3)_2$, which should first be heated to drive off any water of hydration present, is most conveniently added as a finely divided powder to a flowing stream of the molten nitrate salt. It is found that when this is done, the $Ca(NO_3)_2$ dissolves readily and quickly reacts with carbonate and hydroxyl ions to form an insoluble white precipitate generally in the form of a low density froth or sludge. This can be removed in several ways. In one embodiment of this invention, shown in FIG. 1, filtration is used.

In this, a molten salt stream mixture of sodium nitrate and potassium nitrate from the molten salt loop system is fed through salt inlet 10 to mixing chamber 11. At the same time, a stream of anhydrous, finely divided $Ca(NO_3)_2$ is added through calcium inlet 12. While the $Ca(NO_3)_2$ is readily soluble in the molten salt stream, the solution rate can be enhanced by the incorporation of baffles or other agitation means in mixing chamber 11 to increase the stream turbulence therein. The calcium nitrate reacts with carbonate and hydroxide impurities to form the insoluble compounds calcium carbonate and calcium hydroxide.

The molten salt containing these compounds then passes into filter housing 14 containing porous filter element 16 wherein the precipitated $CaCO_3$ and $Ca(OH)_2$ are removed. At the high temperature of the molten salt mix, it will react explosively with most inflammable materials and with many inorganic ones as well. However, it has been found that the salt does not react with stainless steel or a nickel alloy such as Inconel so that a porous filter element comprised of one or both of these materials is preferred as the filter medium. To avoid an excessive pressure drop across the filter, the pore size should be between about 5 and about 20 microns and preferably between about 8 and about 15 microns. To improve the filtration action, a slight vacuum should be maintained on the discharge side of filter element 16. This also aids in the release and removal of any gases, particularly oxygen and any nitrogen oxides that are dissolved in the molten salt stream.

The cleaned molten salt is returned to the heat generation loop through outlet 18. Although careful operation of the system will assure a long filter life, it will, in time, plug up. Cleaning of the filter is accomplished by closing salt inlet and salt outlet valves 20 and 22, respectively, and opening air backwash valves 24 and 26. Backwashing is accomplished by periodically admitting clean, dry air through backwash inlet 28 and blasting the carbonate/hydroxide cake off of the porous element of filter 16. The dislodged cake is then removed along with any contaminated salt still in housing 14 and is discharged through drain outlet 30, after which the system is returned to service.

Figure 2:
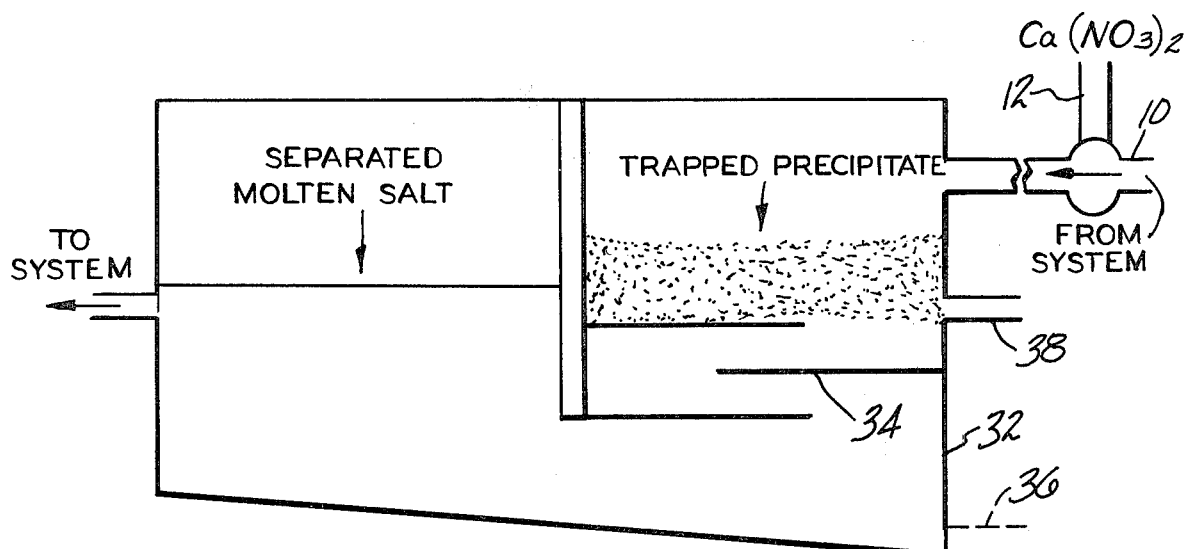
FIG. 2 is a schematic drawing of a system for removing precipitated carbonates and hydroxides from molten nitrate heat transfer salt streams by floatation.

A second approach to removing the carbonate/hydroxide precipitate is in the apparatus shown in FIG. 2. In this embodiment, the salt stream, after the addition of the $Ca(NO_3)_2$, is directed into in-line separator chamber 32. This is primarily a tank lined with a plurality of baffle plates 34. These can be set to divert the precipitate either to the bottom where it is drawn off as a sludge from outlet 36 or to promote the formation of a froth which is skimmed off the top through alternate outlet 38. The designs of baffle systems to accomplish such separation and removal are well known in the art.

The application of either of these embodiments can be in-line, with all the molten salt in the system passing therethrough to remove substantially all the $CO_3^{--}$ or $OH^-$ contamination present. It can also be adapted to remove only a portion of the contamination present. This can be done either by treating a sidestream or by "undertreating" the full flow stream so that while all the contamination is not removed, the amount present is kept at or below the impurity specification limits. When this is done a minimum of about 50% of the stoichiometric amount of $Ca(NO_3)_2$ required in Equation (3) should be used. Further, the process may be applied at any place in the system. However, treating the cooled salt coming from the heat exchanger or the reservoir is preferred since the likelihood of carbonate precipitation is greatest with the lower temperatures occurring in these portions of the system.

The amount of $Ca(NO_3)_2$ needed to remove the $CO_3^{--}$ and $OH^-$ contamination present will depend on the amount of such contamination present. Normally, a slight excess of $Ca(NO_3)_2$ is not harmful to the basic mixed nitrate mix and, in fact, tends to lower the solar salt melting point somewhat. However, to avoid the unwanted and potentially harmful formation of calcium precipitates in other parts of the system, the $Ca(NO_3)_2$ added should be limited to be no more than 10% above the stoichiometric amount required in Equation (3).

The solar salt can be monitored for carbonate and hydroxide either by an in-line electroanalytical process or by removing samples and analyzing for carbonate and hydroxide by wet chemical methods. Methods and apparatus for either approach are well known in the art.

Further, although the above discussion is in terms of calcium nitrate addition, the nitrates of other elements such as lithium, strontium and barium, which form insoluble carbonates and hydroxides in molten solar salt streams can be used with substantially equal utility.

The efficacy of the process of this invention is shown in the following examples.

EXAMPLE 1

About 100 g of a solar salt comprised of 60 weight % $NaNO_3$ and 40 weight % $KNO_3$ with about 2.68 g (0.025 mol) $Na_2CO_3$ impurity was melted in a 30 cm quartz test tube at about 300° C. until the $Na_2CO_3$ had dissolved therein. About 4.15 g (0.025 mol) of anhydrous reagent grade $Ca(NO_3)_2$ was then mixed into the molten salt with the result that a white, insoluble precipitate formed. After standing for about 5 minutes, the molten mix was filtered through a 10 micron porous 316 stainless steel disc. Analysis of the filtrate showed it to have 0.48% (0.008 mol) carbonate contamination. The filter cake, upon x-ray analysis, was found to contain mostly $CaCO_3$.

EXAMPLE 2

Example 1 was repeated but with 3.52 g (0.088 mol) of NaOH impurity replacing the $Na_2CO_3$ in the salt mix. After melting this was treated with 7.22 g (0.044 mol) of $Ca(NO_3)_2$ with the filtrate having 0.05% (0.003 mol) $OH^-$ ion and with the filter cake being largely $Ca(OH)_2$.

EXAMPLE 3

Example 1 was repeated both with 2.68 g $Na_2CO_3$ and 3.52 g NaOH being added to the salt mix. This was treated with 11.37 g (0.113 mol) $Ca(NO_3)_2$ with the filtrate having 0.69% (0.040 mol) $OH^-$ ion and 0.07% (0.001 mol) $CO_3^{--}$ ion with the filter cake being about 60% $CaCO_3$ and 40% $Ca(OH)_2$.

EXAMPLE 4

Example 1 was repeated but with 3.44 g (0.050 mol) of $LiNO_3$ being used to precipitate the $CO_3^{--}$ contamination. The filtrate had 0.11% (0.0018 mol) $CO_3^{--}$ ion with the filter cake being largely $Li_2CO_3$.

EXAMPLE 5

Example 2 was repeated but with 6.06 g (0.088 mol) $LiNO_3$ being used to precipitate the $OH^-$ contamination. The filtrate had 0.81% (0.048 mol) $OH^-$ ion with the filter cake being largely LiOH.

EXAMPLE 6

Example 3 was repeated but with 9.51 g (0.138 mol) $LiNO_3$ being used to precipitate the $CO_3^{--}$ and $OH^-$ contamination. The filtrate had 0.93% (0.054 mol) $OH^-$ and 0.32% (0.005 mol) $CO_3^{--}$ with the filter cake being a $Li_2CO_3$ and LiOH mixture.

EXAMPLE 7

Example 1 was repeated but with 5.29 g (0.025 mol) $Sr(NO_3)_2$ being used to precipitate the $CO_3^{--}$ and $OH^-$ contamination. The filtrate had 0.08% (0.0013 mol) $CO_3^{--}$ with the filter cake being largely $SrCO_3$.

EXAMPLE 8

Example 2 was repeated but with 9.31 g (0.044 mol) $Sr(NO_3)_2$ being used to precipitate the $CO_3^{--}$ and $OH^-$ contamination. The filtrate had 0.17% (0.0094 mol) $OH^-$ with the filter cake being a complex Sr-Na-K hydroxide.

EXAMPLE 9

Example 3 was repeated but with 14.60 g (0.069 mol) $Sr(NO_3)_2$ being used to precipitate the $CO_3^{--}$ and $OH^-$ contamination. The filtrate had 0.38% (0.022 mol) $OH^-$ and 0.40% (0.0066 mol) $CO_3^{--}$ with the filter cake being a mixture of $SrCO_3$ and a complex Sr-Na-K hydroxide.

EXAMPLE 10

Example 1 was repeated but with 6.53 g (0.025 mol) $Ba(NO_3)_2$ being used to precipitate the $CO_3^{--}$ and $OH^-$ contamination. The filtrate had 0.07% (0.001 mol) with the filter cake being mostly $BaCO_3$.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A method for removing carbonate and hydroxyl ion impurities from a molten salt mixture of potassium nitrate and sodium nitrate which comprises:

dissolving a sufficient amount of an anhydrous nitrate salt of an alkali metal or alkaline earth metal in said molten salt capable of forming carbonate and hydroxide compounds which are essentially insoluble therein; and separating said insoluble compounds from said molten salt whereby said impurities are removed.

2. The method of claim 1 wherein said mixture comprises between about 70% and about 30% by weight $NaNO_3$ and between about 30% and about 70% by weight $KNO_3$.

3. The method of claim 2 wherein said mixture comprises about 60% by weight $NaNO_3$ and about 40% by weight $KNO_3$.

4. The method of claim 1 wherein said nitrate salt is selected from the group consisting of $Li_2NO_3$, $Ca(NO_3)_2$, $Sr(NO_3)_2$ and $Ba(NO_3)_2$.

5. The method of claim 4 wherein said nitrate salt is $Ca(NO_3)_2$.

6. The method of claim 4 wherein said sufficient amount of said nitrate salt is from 50 to 110% of the stoichiometric amount.

7. The method of claim 1 wherein said molten salt is at a temperature of between about 400° to about 650° F.

8. The method of claim 6 wherein said molten salt is at a temperature of between about 500° F. and 550° F.

9. The method of claim 1 wherein said insoluble compounds are separated by filtration.

10. The method of claim 9 wherein said filtration comprises passing said molten salts containing said insoluble impurities through a porous filter element.

11. The method of claim 10 wherein said porous filter element has pore openings of between about 5 and about 20 microns.

12. The method of claim 11 wherein said porous filter element has pore openings of between about 8 and 15 microns.

13. The method of claim 10 wherein said porous filter element is made from stainless steel.

14. The method of claim 10 wherein said porous filter element is made from Inconel.

15. The method of claim 9 wherein said filter is periodically cleaned.

16. The method of claim 15 wherein said cleaning step comprises backwashing said porous filter with dry air whereby said insoluble carbonates and hydroxides are blasted off said filter element.

17. The method of claim 1 wherein said insoluble compounds are settled in settling means and removed from said molten salt.

18. The method of claim 1 wherein said insoluble compounds are frothed in said molten salt and said froth is skimmed from the surface of said molten salt.

* * * * *